(12) United States Patent
Park et al.

(10) Patent No.: US 8,839,916 B2
(45) Date of Patent: Sep. 23, 2014

(54) CONTROL METHOD FOR PARKING RELEASE APPARATUS OF SHIFT-BY-WIRE SHIFTING DEVICE

(75) Inventors: Hangil Park, Suwon-si (KR); Changhyun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 305 days.

(21) Appl. No.: 13/285,539

(22) Filed: Oct. 31, 2011

(65) Prior Publication Data

US 2012/0138394 A1   Jun. 7, 2012

(30) Foreign Application Priority Data

Dec. 2, 2010   (KR) .................. 10-2010-0122040

(51) Int. Cl.
  *F16D 66/00*   (2006.01)
  *B60T 7/12*    (2006.01)
  *B60T 13/74*   (2006.01)

(52) U.S. Cl.
  CPC ........ *B60T 7/12* (2013.01); *B60T 13/746* (2013.01)
  USPC ....... 188/1.11 E; 188/378; 188/379; 477/197; 477/91; 477/92

(58) Field of Classification Search
  USPC .............................. 188/378, 379; 477/92, 96; 192/219.4–219.6; 74/473.1
  See application file for complete search history.

(56) References Cited

U.S. PATENT DOCUMENTS

| | | | | |
|---|---|---|---|---|
| 3,698,505 | A * | 10/1972 | Webley .................. | 180/287 |
| 5,417,624 | A * | 5/1995 | Weissbrich et al. .......... | 477/71 |
| 5,925,940 | A | 7/1999 | Donatelle et al. | |
| 6,293,363 | B1 | 9/2001 | Rangaswamy et al. | |
| 7,707,904 | B2 * | 5/2010 | Kimura et al. .................. | 74/335 |
| 7,762,926 | B2 * | 7/2010 | Peterson ................... | 477/172 |
| 7,815,546 | B2 * | 10/2010 | Jagodzinski ................ | 477/185 |
| 8,047,963 | B2 * | 11/2011 | Inoue ........................... | 477/197 |
| 8,281,681 | B2 * | 10/2012 | Kimura et al. ............. | 74/473.12 |
| 8,282,530 | B2 * | 10/2012 | Yamamoto .................... | 477/92 |
| 2008/0039282 | A1 * | 2/2008 | Yoshiyama et al. ............ | 477/96 |
| 2008/0090702 | A1 * | 4/2008 | Hopf et al. .................. | 477/197 |
| 2008/0302628 | A1 | 12/2008 | Kimura et al. | |
| 2009/0176619 | A1 * | 7/2009 | Inoue ............................ | 477/96 |
| 2010/0048352 | A1 * | 2/2010 | Yamamoto .................... | 477/92 |

FOREIGN PATENT DOCUMENTS

| | | |
|---|---|---|
| JP | 10-292694 A | 11/1998 |
| JP | 2005-207462 A | 8/2005 |
| JP | 2008-151210 A | 7/2008 |
| JP | 2008-304010 A | 12/2008 |
| KR | 10-2008-0013767 A | 2/2008 |
| KR | 10-2010-0094379 A | 8/2010 |

* cited by examiner

*Primary Examiner* — Robert A Siconolfi
*Assistant Examiner* — James Hsiao
(74) *Attorney, Agent, or Firm* — Morgan, Lewis & Bockius LLP

(57) ABSTRACT

A control method for a parking release apparatus of a shift-by-wire shifting device can improve the commercial value of a vehicle by improving safety of the vehicle and preventing robbery, by interfering with or preventing an attempt of abnormally and manually releasing a parking state of the vehicle when there is no problem in the electric system of the vehicle, using a part provided to be manually operated in the parking release apparatus such that a P-stage state and an N-stage state can be manually switched when a problem, such as discharge, occurs in the electric system, in the vehicle equipped with a shift by wire apparatus.

4 Claims, 3 Drawing Sheets

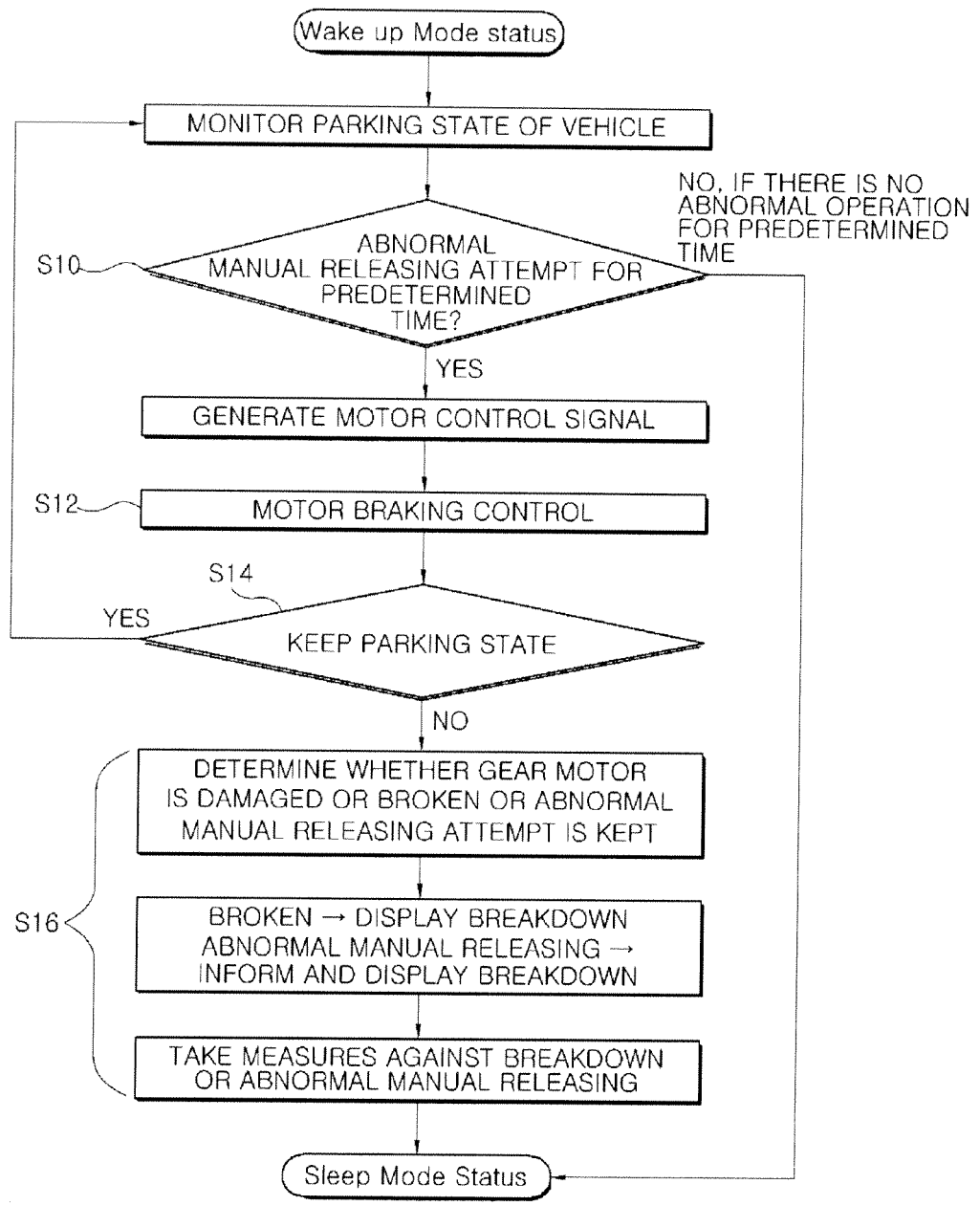

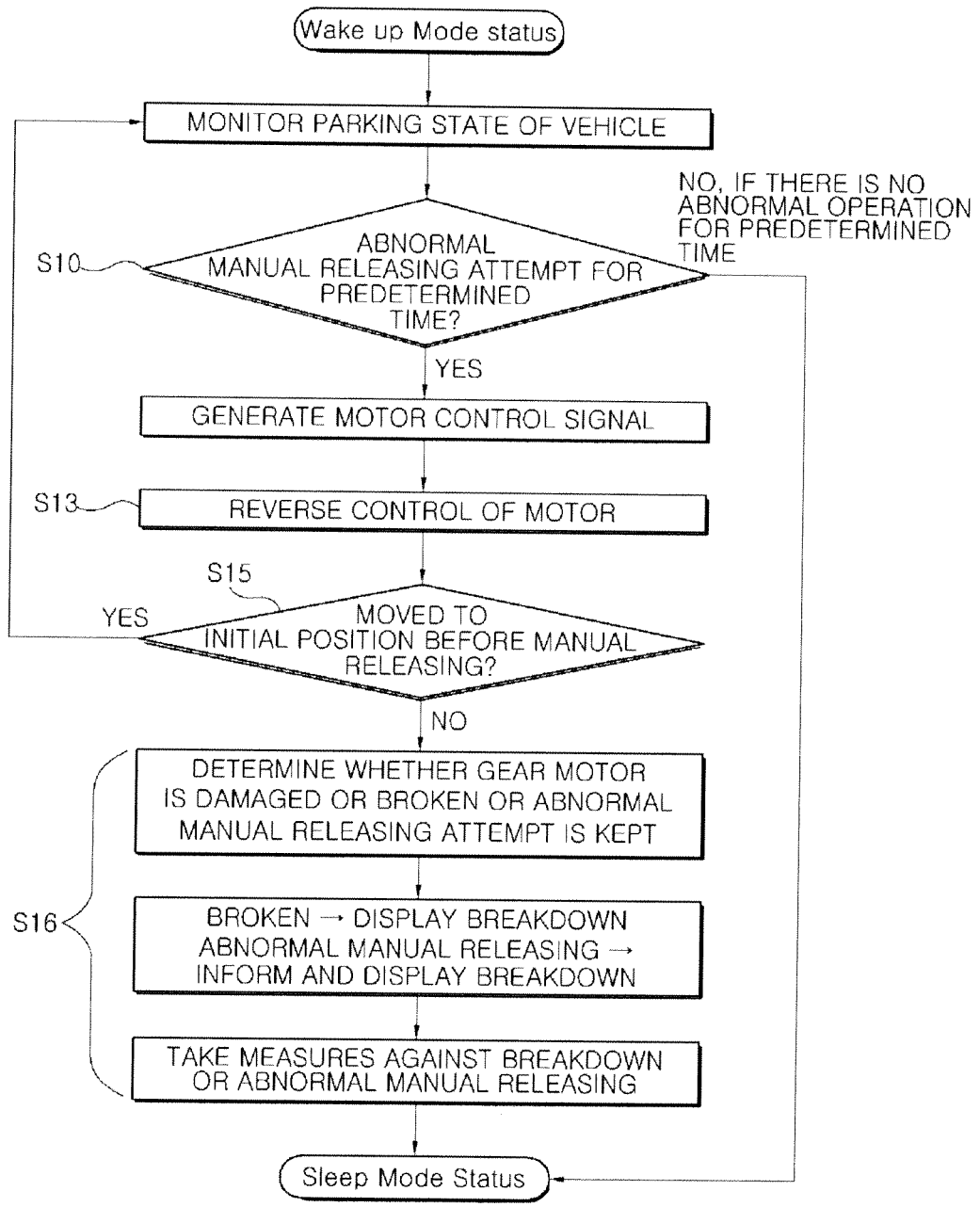

ent application claims priority to Korean Patent Application Number 10-2010-0122040 filed Dec. 2, 2010, the entire contents of which application is incorporated herein for all purposes by this reference.

CONTROL METHOD FOR PARKING RELEASE APPARATUS OF SHIFT-BY-WIRE SHIFTING DEVICE

CROSS-REFERENCE TO RELATED APPLICATIONS

The present application claims priority to Korean Patent Application Number 10-2010-0122040 filed Dec. 2, 2010, the entire contents of which application is incorporated herein for all purposes by this reference.

BACKGROUND OF INVENTION

1. Field of Invention

The present invention relates to a method of mechanically releasing a parking state in a vehicle equipped with a shift-by-wire shifting device, and more particularly, to a control method of preventing a parking state from being released by inappropriate operation of a parking release apparatus.

2. Description of Related Art

Shift by wire shifting devices are devices that control a transmission, using electric signals, in response to signals generated when a driver operates the shift lever, without transmitting the operational force of the shift lever applied by the user through a mechanical cable, as in the related art.

Meanwhile, double parking or parallel parking is frequently unavoidable due to insufficient parking space in Korea, and accordingly, it is required to park in the N-stage state such that vehicles can be pushed by external force.

Further, it is required to release the parking state such that the vehicle wheels can freely rotate, when washing the vehicle with a car washing apparatus.

Further, it is required to manually shift between the P-stage state and the N-stage state in the vehicles equipped with the shift-by-wire shifting device, as described above, when a problem occurs in the electric system, such as discharge, which is prescribed by law.

Accordingly, as shown in FIG. 1, a parking release apparatus that allows for switching a transmission from a P-stage state to an N-stage state, using a mechanical mechanism is required.

The device shown in FIG. 1 is parking release apparatus where the control method of the present invention can be applied, which includes a motor 502 that is controlled by a controller 500, a first worm wheel 506 that is engaged with a first worm gear 504 provided on a rotary shaft of motor 502 to rotate, a second worm wheel 510 that is engaged with a second worm gear 508 integrally fitted in and/or monolithically formed with first worm wheel 506, and a cable guide 514 that rotates coaxially with second worm wheel 510 and pulls or releases an end of a parking cable 512 while rotating such that operational motion can be transmitted to the transmission.

Further, the parking release apparatus includes a rotation sensor 516 that can sense the amount of rotation of cable guide 514 or second worm wheel 510 and allows controller 500 to control the operational motion transmitted through parking cable 512 by recognizing the amount of rotation of cable guide 514 in response to a signal from rotation sensor 516.

First worm wheel 506 has a tool hole to insert a tool and manually rotate it such that the P-stage state and the N-stage state can be switched when a problem occurs in the electric system, such as discharge, but the tool hole may be used to rotate first worm wheel 506 for fun or a robbery, other than when a problem occurs in the electric system, as described above.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a control method for a parking release apparatus of a shift-by-wire shifting device that can improve the commercial value of a vehicle by improving safety of the vehicle and preventing robbery, by interfering with or preventing an attempt of abnormally and manually releasing a parking state of the vehicle when there is no problem in the electric system of the vehicle, using a part provided to be manually operated in the apparatus for releasing a parking state such that a P-stage state and an N-stage state can be manually switched when a problem, such as discharge, occurs in the electric system, in the vehicle equipped with a shift by wire apparatus.

Various aspects of the present invention provide for control method for a parking release apparatus of a shift-by-wire shifting device, which comprises determining a releasing attempt that determines whether there is an abnormal manual releasing attempt, on the basis of whether there is movement in a display part that can make operational displacement in a parking cable by motion in the parts of the parking release apparatus, anti-releasing that performs control to prevent rotation of a motor, using a braking circuit of the motor, when there is an abnormal manual releasing attempt, checking parking that determines whether the display part is at the position where it can be considered that a vehicle is kept parked, after the anti-releasing, and post processing that informs breakdown or makes an alarm when it is determined that parking is not kept by the checking parking.

Other aspects of the present invention provide for a control method for a parking release apparatus of a shift-by-wire shifting device, which comprises determining a releasing attempt that determines whether there is an abnormal manual releasing attempt, on the basis of whether there is movement in a display part that can make operational displacement in a parking cable by motion in the parts of the parking release apparatus, reverse controlling that prevents the display part from moving and returning it by controlling a motor in the opposite direction, when there is an abnormal manual releasing attempt, checking an initial position that determines whether the display part has returned to the position before the abnormal manual releasing attempt, after the reverse controlling, and post processing that informs breakdown or makes an alarm when it is determined that the display part has not returned to the initial position by the checking an initial position.

According to various aspects of the present invention, it is possible to improve the commercial value of a vehicle by improving safety of the vehicle and preventing robbery, by interfering with or preventing an attempt of abnormally and manually releasing a parking state of the vehicle when there is no problem in the electric system of the vehicle, using a part provided to be manually operated in the parking release apparatus such that a P-stage state and an N-stage state can be manually switched when a problem, such as discharge, occurs in the electric system, in the vehicle equipped with a shift by wire apparatus.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a flowchart illustrating an exemplary method according to the present invention.

FIG. 3 is a flowchart illustrating an exemplary method according to the present invention.

Figure 1:
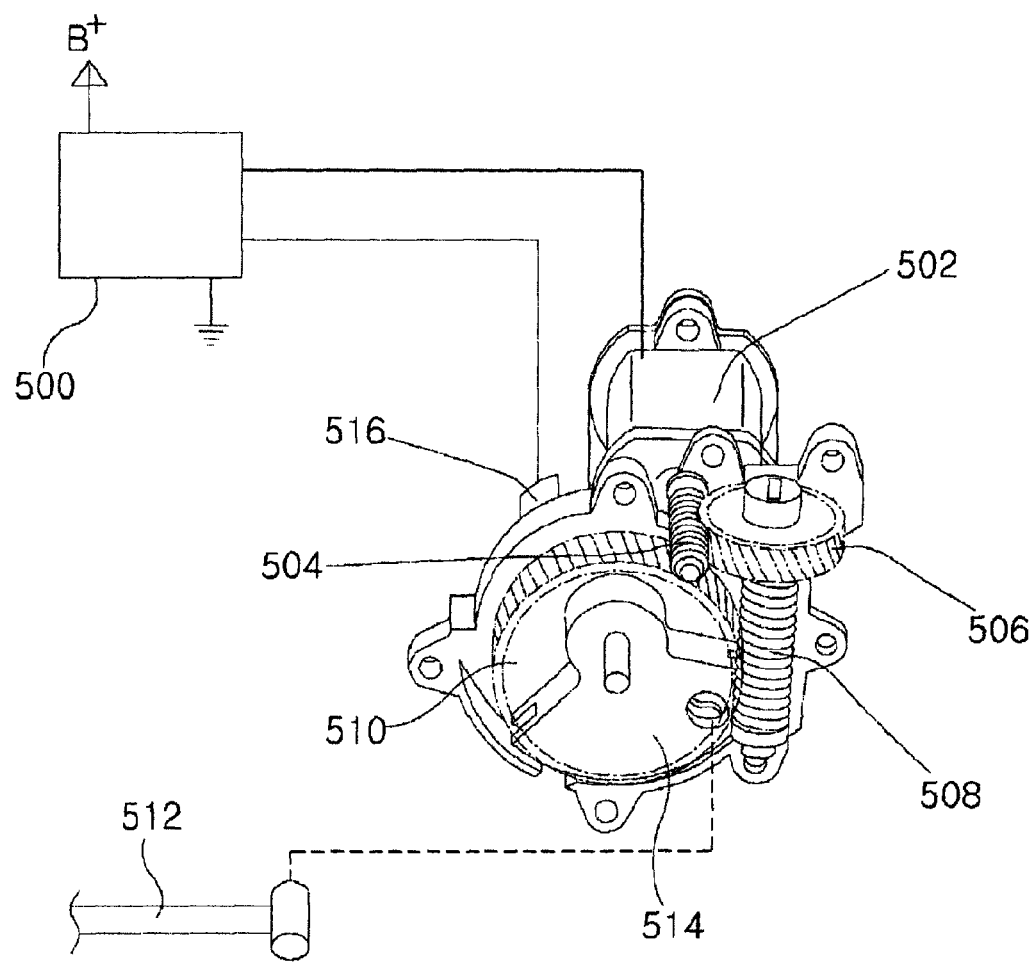
FIG. 1 is a view illustrating the structure of an exemplary parking release apparatus of a shift-by-wire shifting device according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 2, various embodiments of the present invention include determining a releasing attempt (S10) that determines whether there is an abnormal manual releasing attempt, on the basis of whether there is movement in a display part that can make operational displacement in a parking cable by motion in the parts of a parking release apparatus, anti-releasing (S12) that performs control to prevent rotation of a motor, when there is an abnormal manual releasing attempt, using a braking circuit of the motor, checking parking (S14) that determines whether the display part is at the position where it can be considered that the vehicle is kept parked, after the anti-releasing (S12), and post processing (S16) that informs breakdown or makes an alarm when it is determined that parking is not kept by the checking parking (S14).

The display part that can make operational displacement in a parking cable by motion in the releasing attempt may be a first worm wheel 506, a second worm wheel 510, and a cable guide 514 in the apparatus for releasing a parking state shown in FIG. 1. When a rotation sensor that senses the rotational state of second worm wheel 510 is provided in the related art, the releasing attempt can be performed by a signal from the rotation sensor, in which the display part will be second worm wheel 510.

That is, first worm wheel 506 or second worm wheel 510 described above does not move in a normal parking state and movement of those parts may be considered as there is an attempt to release the parking state by forcibly moving the parts.

Determining a releasing attempt (S10) is performed for a predetermined time that is set to prevent a vehicle from being discharged and may switches a controller to a sleep mode when there is no abnormal manual releasing attempt for the predetermined time.

The predetermined time is a level where the vehicle can be prevented from being discharged, as described above, at the largest, for example, several hours or tens of hours or more.

Anti-releasing (S12) prevent the parking state from being inappropriately released even in the above attempt by preventing the motor from being rotated by abnormal manual releasing attempt such that all the parts mechanically connected with the motor cannot move, using the braking circuit of a well-known motor.

Post processing (S16) ascertains whether the parts of the apparatus for releasing a parking state are damaged or broken or an abnormal manual releasing attempt is kept, displays a breakdown when the parts are damaged or broken, and generates an alarming signal when an abnormal manual releasing attempt is kept.

Therefore, an abnormal manual releasing attempt for fun or a robbery is prevented first by the braking operation of the motor and second measures, such as making an alarm, are taken against the continuous abnormal manual releasing attempt, in addition to diagnosis and display of a breakdown, when the force applied for manual releasing attempt is excessive or the parking state is not kept, thereby improving safety of the vehicle and preventing a robbery or an operation for play.

As shown in FIG. 3, other exemplary embodiments of the present invention, may include determining a releasing attempt (S10) that determines whether there is an abnormal manual releasing attempt, on the basis of whether there is movement in a display part that can make operational displacement in a parking cable by motion in the parts of a parking release apparatus, reverse controlling (S13) that prevents the display part from moving and returning it by controlling a motor in the opposite direction, when there is an abnormal manual releasing attempt, checking an initial position (S15) that determines whether the display part has returned to the position before the abnormal manual releasing attempt, after reverse controlling (S13), and a post processing (S16) that informs breakdown or makes an alarm when it is determined that the display part has not returned to the initial position by checking an initial position (S15).

That is, although the other steps are the same as those described, the reverse controlling (S13) that controls the display part to return to the initial position, in addition to preventing movement of the display part by reversely controlling the motor, and the checking an initial position (S15) that determines whether the display part has returned to the initial position, when there is an abnormal manual releasing attempt, may be different from the embodiments described above.

The reverse controlling (S13) actively implements an opposite operation against an abnormal manual releasing attempt, for example, restores the parking state by reversely controlling the motor, for example, even if the parking state has been released by the manual releasing attempt, and the checking an initial position (S15) determines whether the returning has been succeeded.

The other control steps are generally the same in the above-described embodiments and have a relative advantage of managing the abnormal manual releasing attempt, even without a specific braking circuit.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for a parking release apparatus of a shift-by-wire shifting device, the method comprising:
   determining a releasing attempt that determines whether there is an abnormal manual releasing attempt on the basis of whether there is movement in a display part, wherein the display part is capable of making operational displacement in a parking cable by motion in parts of the parking release apparatus, wherein the determining a releasing attempt is performed for a predetermined time that is set to prevent the vehicle from being moved;
   anti-releasing that performs control to prevent rotation of a motor, using a braking circuit of the motor, when it is determined that there is the abnormal manual releasing attempt;
   checking parking subsequent to the anti-releasing, that determines whether the display part is at a position corresponding to a vehicle in a parking state;
   post processing that informs breakdown or makes an alarm when it is determined that the display part is not at the position corresponding to the vehicle in the parking state; and
   switching a controller to a sleep mode when there is no abnormal manual releasing attempt for the predetermined time.

2. The control method as defined in claim 1, wherein the post processing:
   ascertains whether the parts of the parking release apparatus are damaged or broken or the abnormal manual releasing attempt is kept,
   displays a breakdown when the parts are damaged or broken, and
   generates an alarming signal when the abnormal manual releasing attempt is kept.

3. A control method for a parking release apparatus of a shift-by-wire shifting device, the method comprising:
   determining a releasing attempt that determines whether there is an abnormal manual releasing attempt on the basis of whether there is movement in a display part, wherein the display part is capable of making operational displacement in a parking cable by motion in parts of the parking release apparatus, wherein the determining a releasing attempt is performed for a predetermined time that is set to prevent the vehicle from being moved;
   reverse controlling that prevents the display part from moving and returns the display part by controlling a motor in an opposite direction, when it is determined that there is the abnormal manual releasing attempt;
   checking an initial position, subsequent to the reverse controlling, that determines whether the display part has returned to the initial position, wherein the initial position is a position of the display part before the abnormal manual releasing attempt; and
   post processing that informs breakdown or makes an alarm when it is determined that the display part has not returned to the initial position; and
   switching a controller to a sleep mode when there is no abnormal manual releasing attempt for the predetermined time.

4. The control method as defined in claim 3, wherein the post processing:
   ascertains whether the parts of the parking release apparatus are damaged or broken or the abnormal manual releasing attempt is kept,
   displays a breakdown when the parts are damaged or broken, and
   generates an alarming signal when the abnormal manual releasing attempt is kept.

* * * * *